United States Patent [19]

Terayama et al.

[11] Patent Number: 4,741,934

[45] Date of Patent: May 3, 1988

[54] STEEL SHEET FOR MAKING CANS, CANS AND A METHOD MAKING CANS

[75] Inventors: Kazukiyo Terayama; Yashichi Oyagi; Yukio Tsukamoto, all of Kitakyushu, Japan

[73] Assignee: Nippon Steel Corporation, Tokyo, Japan

[21] Appl. No.: 848,581

[22] Filed: Apr. 7, 1986

[30] Foreign Application Priority Data

Apr. 19, 1985 [JP] Japan ..... 60-82283
Jun. 12, 1985 [JP] Japan ..... 60-126208
Feb. 13, 1986 [JP] Japan ..... 61-27885

[51] Int. Cl.[4] ..... B65D 25/14; A21D 51/26

[52] U.S. Cl. ..... 428/35; 428/457; 428/461; 426/126; 426/131; 220/450; 413/1

[58] Field of Search ..... 426/126, 131; 220/450; 428/35, 457, 461; 72/42, 46; 413/1

[56] References Cited

U.S. PATENT DOCUMENTS

| | | | |
|---|---|---|---|
| 3,888,224 | 6/1975 | Okuhara et al. | 426/126 |
| 4,177,323 | 12/1979 | Obi et al. | 428/622 |
| 4,195,006 | 3/1980 | Brown et al. | 426/131 |
| 4,339,483 | 7/1982 | Ueno et al. | 426/126 |
| 4,358,493 | 11/1982 | Ohtsuki et al. | 428/35 |
| 4,445,813 | 5/1984 | Misra | 413/1 |
| 4,450,977 | 5/1984 | Colburn et al. | 220/458 |
| 4,452,374 | 6/1984 | Hitchcock et al. | 220/458 |
| 4,506,533 | 3/1985 | Hessel et al. | 413/1 |
| 4,623,680 | 11/1986 | Azarnia et al. | 426/131 |

FOREIGN PATENT DOCUMENTS 53-36575 4/1978 Japan .

*Primary Examiner*—John E. Kittle
*Assistant Examiner*—James J. Seidleck
*Attorney, Agent, or Firm*—Parkhurst & Oliff

[57] ABSTRACT

A steel sheet for making cans carrying a layer of a thermoplastic resin having a thickness of 3 to 100 microns on at least one surface thereof which, when shaped into a can, will define its inner surface, and a foil of aluminum or an aluminum alloy having a thickness of 5 to 100 microns on the resin layer. Also disclosed is a can for holding a drink which is formed from such a steel sheet, and which has a layer of a thermosetting resin on the foil. A method of making any such can is also disclosed.

8 Claims, No Drawings

STEEL SHEET FOR MAKING CANS, CANS AND A METHOD MAKING CANS

BACKGROUND OF THE INVENTION

1. Field of the Invention:

This invention relates to a steel sheet of high workability for making cans, cans having a high degree of corrosion resistance and a method of making them. More particularly, it relates to a laminated steel sheet composed of a thin sheet of steel, a layer of a thermoplastic resin and a foil containing aluminum, cans formed essentially from any such laminated steel sheet and a method of making them.

2. Description of the Prior Art:

Cans for holding beer or other carbonated drinks are usually made of an aluminum alloy or tinplate by a combined process of drawing and ironing. They are the so-called drawn and ironed cans. Tinplate is a sheet of steel having an electrocoated layer of tin. This layer usually has only a minimum thickness obtained by employing 2.8 to 5.6 g of tin per square meter, since tin is expensive. A drawn and ironed can requires a strong force for its manufacture, as opposed to a soldered can. The drawn and ironed can has a wall thickness which is as thin as about one-third of the original thickness of tinplate. The severe work of drawing and ironing forms numerous defects in the coated tin layer. An organic protective coating is, therefore, essentially required on the inner surface of a drawn and ironed tinplate can to ensure its corrosion resistance to the drink which it holds. It is usually necessary to repeat the application and baking of any such protective coating twice in order to eliminate the coating defects completely. They are, however, usually done only once for an aluminum can, since aluminum has a relatively high degree of corrosion resistance and an aluminum can is, therefore, satisfactory in corrosion resistance even if there may remain some coating defects.

There are also known drawn and ironed cans which are not made of tinplate, but are formed from a steel sheet coated with a specific organic film. They are disclosed in, for example, Japanese Laid-Open Patent Specifications Nos. 94585/1979 and 174242/1982.

There is also known a laminated material which is composed of two metal sheets and a resin layer disposed therebetween. For example, Japanese Laid-Open Patent Specification No. 036575/1978 discloses a method which produces a laminated metal sheet by forming a resin layer on a steel sheet and laying an aluminum sheet on the resin layer. This laminated sheet is, however, not intended for use in making cans. The specification states that it is intended for use in the field of electrical appliances and provides an inexpensive decorative material. Insofar as it is intended for decorative use, the aluminum side of the laminated sheet having a better appearance is used to form the outer surface of any product thereof.

The protective coating repeated twice on the inner surface of a tinplate on account of thin plating of tin as described above can necessarily results in an increased cost of can production. The cans not made of tinplate, but formed from a steel sheet coated with a organic film are not satisfactory in corrosion resistance.

SUMMARY OF THE INVENTION

It is an object of this invention to overcome the drawbacks of the prior art as hereinabove pointed out and provide a steel sheet for making cans which is excellent in workability and corrosion resistance and inexpensive and does not require any repeated protective coating on the inner surface of a can.

It is another object of this invention to provide an improved can.

It is still another object of this invention to provide a method of producing an improved can.

The steel sheet of this invention comprises a thin sheet of steel carrying an aluminum or aluminum alloy foil of high corrosion resistance having a thickness of 5 to 100 microns on a layer of a thermoplastic resin having a thickness of 1 to 100 microns on at least one surface thereof which defines the inner surface of a can formed therefrom. The other surface of the steel sheet preferably carries a lubricating film thereon.

The can of this invention comprises a wall formed from a thin sheet of steel and having an inner surface carrying a layer of a thermoplastic resin, a foil of aluminum or an aluminum alloy on the thermoplastic resin layer and a layer of a thermosetting resin on the foil.

The method of this invention comprises preparing a thin sheet of steel carrying on at least one surface thereof a layer of a thermoplastic resin and a foil of aluminum or an aluminum alloy on the thermoplastic resin layer, shaping the sheet into a can having an inner surface defined by the foil, and coating the inner surface of the can with a thermosetting resin.

DETAILED DESCRIPTION OF THE INVENTION

The steel sheet of this invention has a thickness of 0.4 mm or less, and includes a plating layer and/or a chemically treated layer on the surface thereof.

The steel sheet of this invention includes a foil of aluminum or an aluminum alloy having a thickness of 5 to 100 microns. If the thickness of the foil is less than five microns, it is difficult to make a can which is satisfactory in corrosion resistance. No foil thickness exceeding 100 microns is economical.

The steel sheet of this invention includes a layer of a thermoplastic resin having a thickness of 3 to 100 microns between the steel and the aluminum or aluminum alloy foil. This layer is important for two reasons. In the first place, it serves as an adhesive for makimg a strong bond between the steel and the foil. In the second place, it effectively prevents the dissolution of iron into the content that the foil has lost its protective action. A still more important advantage of the layer is that it electrically isolates the steel from the aluminum or aluminum alloy and thereby prevents any increased dissolution of iron or aluminum by a local cell action.

The presence of the aluminum or aluminum alloy foil is important for three major reasons. In the first place, it is important from the stnadpoint of corrosion resistance. In practice, the inner surface of a drawn and ironed can is coated with a thermosetting epoxyphenol or vinyl paint. If any coating defect has appeared in any portion of the inner surface of the can, the foil in that portion prevents any water, oxygen, anion, etc. from reaching the steel surface and thereby inhibits the elution of iron therefrom.

In the second place, the presence of the foil is important from the standpoint of workability during the manufacture of a can. As far as corrosion resistance is concerned, it is possible to achieve a considerable improvement if the resin layer on the steel surface defining the inner surface of a can has a large thickness of at least 50 microns. The presence of a resin layer having such a large thickness, however, presents a serious problem from the standpoint of workability. The steel sheet is reduced to about one-third in thickness when making a drawn and ironed can. It is necessary to use a thermoplastic resin having a high degree of elongation to form the resin layer. An oriented film is unacceptable from the standpoint of workability. The resins having a high degree of elongation, however, are usually very soft and likely to stick to the surface of a punch which is used to form the sheet into the shape of a cup. The cup is, therefore, difficult to be stripped out from the punch. This means a serious obstacle to the high-speed work of can making. The failure of cans to be separated from the punch makes it necessary to stop the production line frequently. This problem is solved by the aluminum or aluminum alloy foil.

In the third place, the foil protects the underlying resin layer. It prevents the resin layer from being broken into pieces by a shearing force during the drawing and ironing process and maintains it in the form of a continuous layer. Moreover, it has an important role of helping the underlying resin layer restore a sound film providing a strong bonding strength and not having any pinholes or similar defects when melted by the heat applied for baking the protective coating on the inner surface of a can. The baking temperature is from 170° C. to 190° C. if the coating is of a thermosetting vinyl resin, and from 200° C. to 220° C. if it is of a thermosetting epoxyphenol resin.

The layer of aluminum or an alloy thereof on the thin steel sheet as a base ensures the high corrosion resistance and workability of the steel sheet according to this invention and the layer of a thermoplastic resin is effectively utilized to provide an highly corrosive and economical advantage.

The thermoplastic resin layer is required to maintain a high bonding strength and to remain continuous even after the steel sheet has been worked at a high reduction ratio to about one-third in thickness. It is, therefore, advisable to use a soft thermoplastic resin, such as an acrylic, polyester, polyamide or polyolefin resin, or synthetic resin type rubber.

It is desirable for the layer to have a large thickness from the standpoint of corrosion resistance. A thickness of 3 to 100 microns is, however, sufficient for the layer on a drawn and ironed can. A preferred thickness is from 10 to 50 microns. A thickness which is thinner than three microns should be avoided, as it disables the layer to maintain continuity when subjected to drawing and ironing.

The foil of aluminum or an alloy thereof has a thickness of 5 to 100 microns, or preferably, 10 to 40 microns. If it is too thin, a large number of pinholes form and make it difficult to maintain a high degree of corrosion resistance. A foil having too large a thickness is unacceptable from an economical standpoint.

When a can is formed from the steel sheet of this invention, its aluminum or aluminum alloy face defines the inner surface of the can so that its high corrosion resistance and workability may be effectively utilized. No such composite foil and resin layer is necessarily required for the other face of the sheet defining the outer surface of the can. It is, however, desirable and sufficient for the other surface of the sheet to have a sufficiently high degree of lubricating property to withstand a hard work of shaping and give the outer surface of a can a high degree of printability and rust resistance. It is, therefore, preferable to coat the other surface of the sheet with a lubricating film. It may be a metallic film formed from tin or zinc or an alloy thereof, an inorganic film of a phosphate or molybdenum disulfide, or an organic film formed from a thermoplastic resin of good workability, such as an epoxy, vinyl or polyester resin.

The metallic film is required to have a thickness of at least 0.1 micron in order to ensure good workability and rust resistance. Its maximum thickness may be somewhere between two and five microns from an economical standpoint.

In order to form a phosphate film, it is necessary to use a soft phosphate and a highly lubricant oil. It is necessary to employ, for example, 0.5 to 5 g of a phosphate per square meter. It is possible to form both a zinc or zinc alloy film and a phosphate film so that the latter may lie on the former.

In case an organic film is formed on the outer surface of a can, it is preferable to form it on the steel surface subjected to an appropriate surface treatment, for example, coated with a metallic chromium film and/or a hydrated chromium oxide film, in order to prevent corrosion from occurring under the organic film. The organic film is required to have a thickness of, for example, 2 to 20 microns. A thickness of, for example, 6 to 10 microns is preferred.

The steel sheet of this invention is used to make a can by drawing and ironing in such a way that its aluminum or aluminum alloy face may directly define the inner surface of the can. It enables the high-speed production of cans, as it does not develop any coating defect, and as it has a high degree of workability. It is, however, needless to say that the steel sheet of this invention is equally applicable to any purpose involving only the work of drawing.

The can which has been formed from the steel sheet of this invention eventually has its inner surface coated with a paint consisting mainly of a thermosetting resin and yields a final product of high corrosion resistance. An air or airless spraying method may be used to apply the paint to the inner surface of the can. It is possible to use a moving or fixed spray gun, while the can is rotated at a high speed. Only a very short time not exceeding 0.1 second is required for the application of the paint to each can that is meanwhile rotated at least three times. It is more difficult to obtain a uniform coating thickness when spraying the paint than when using a roll coater. It is, therefore, necessary to select carefully the shape and position of a spray nozzle, the paint, the solvent to be used, the rotating speed of the cans, etc.

The thermosetting vinyl, epoxyamino and epoxyphenol resin paints are examples of the paints which are used more often than any other paint. The paint is applied in the quantity of 3 to 10 g/m$^2$. The baking temperature depends on the paint and ranges from 170° C. to 190° C. for a vinyl resin paint and from 200° C. to 220° C. for an epoxy resin paint. The paint is baked for several minutes, for example 5 to 10 minutes. Even if the paint may be applied in a quantity exceeding 10 g/m$^2$, it is impossible to obtain a uniformly thick coating, as its low viscosity causes it to drip. The lower limit is the quantity which enables the uniform distribution of the paint without leaving any uncoated area. In any event, it is advisable to apply the paint so that it may form a coated layer having a dry thickness of 1 to 15 microns.

The can produced as hereinabove described is, thus, characterized by comprising a wall formed from a thin sheet of steel and having an inner surface carrying a thermoplastic resin layer thereon applied on the sheet, an aluminum or aluminum alloy foil on the thermoplastic resin layer and a thermosetting resin layer on the foil applied after making the can. The outer surface of the can may be, for example, coated with a desired paint or painted in a customary way.

The steel sheet of this invention carrying a thermoplastic resin layer having a thickness of 3 to 100 microns on the inner surface of a can and an aluminum or aluminum alloy foil having a thickness of 5 to 100 microns on the thermoplastic resin layer is shaped into a can in such a way that the thermoplastic resin layer may have a thickness of 1 to 30 microns, or preferably 4 to 10 microns, while the foil has a thickness of 1 to 30 microns, or preferably 2 to 10 microns.

If the thickness of the thermoplastic resin layer is reduced to less than one micron when the steel sheet is shaped into a can, it lacks corrosion resistance and fails to provide a satisfactory bonding strength. Any thickness exceeding 30 microns is undesirable, as it makes it difficult to strip out a can from a punch, and also from an economical standpoint.

If the thickness of the foil is reduced to less than one micron, it forms a large number of pinholes and fails to provide any satisfactory corrosion resistance. A foil thickness exceeding 30 microns is undesirable from an economical standpoint.

The most upper surface of the can is coated with a thermosetting resin layer having a thickness of 1 to 15 microns, as hereinabove described. Thus, the can of this invention comprises a wall formed from a thin sheet of steel and having an inner surface carrying a thermoplastic resin layer having a thickness of 1 to 30 microns thereon, an aluminum or aluminum alloy foil having a thickness of 1 to 30 microns on the thermoplastic resin layer and a thermosetting resin layer having a thickness of 1 to 15 microns on the foil.

The invention will now be described more specifically with reference to a plurality of examples thereof.

EXAMPLE 1

An aluminum foil complying with the specification of JIS IN30 and having a thickness of 20 microns was bonded to each surface of a clean sheet of steel having a thickness of 0.27 mm by a thermoplastic polyester resin adhesive having a dry thickness of five microns. Then, the sheet was shaped into a can having a sidewall thickness of 0.100 mm and an outside diameter of 65 mm by two steps of drawing and three steps of ironing. The inner and outer surfaces of the can were degreased with a sodium phosphate degreasing agent and treated with an agent containing chromic acid and phosphoric acid. Then, a thermosetting epoxyphenol resin paint was sprayed once onto the inner surface of the can and baked at 210° C. for 10 minutes to form a coated layer having a dry thickness of five microns.

A plurality of cans were prepared as hereinabove described. Some of the cans were filled with a carbonated drink known as a cola, while the other cans were filled with a transparent carbonated drink known under the tradename "Sprite". After a certain period of time, they were examined for perforation due to corrosion and for the elution of iron. The results are shown in TABLE 1 which also shows the results of the examples which will hereinafter be described.

A rust resistance test was conducted on the outer surface of each can. It was alternately wetted and dried every one hour at a temperature of 40° C. until red rust formed thereon.

TABLE 1 shows the composition of the various layers on each can by the values measured at the middle point of its height.

EXAMPLE 2

A thin sheet of steel having a thickness of 0.28 mm was coated on one surface thereof with a film of metallic chromium and hydrated chromium oxide containing 120 mg of chromium per square meter. The other surface of the sheet was plated with 2.7 g of tin per square meter. An aluminum foil complying with the specification of JIS IN30 and having a thickness of 15 microns was bonded to the chromium film by a thermoplastic nylon adhesive layer having a thickness of 20 microns. The procedures of EXAMPLE 1 were, then, repeated for the production of a plurality of cans, their surface treatment, their inner surface coating and their tests.

EXAMPLE 3

An aluminum foil of 99.9% purity having a thickness of 30 microns was bonded to one of the clean surfaces of a sheet of steel having a thickness of 0.28 mm by a thermoplastic polyurethane resin adhesive layer having a dry thickness of seven microns. The other surface of the sheet was plated with 2.8 g of tin per square meter. It was intended for use in forming the outer surface of a can. The procedures of EXAMPLE 1 were repeated for the preparation of cans, their inner surface coating and their corrosion resistance tests. The results are shown in TABLE 1.

EXAMPLE 4

An aluminum foil provided by the specification of JIS IN30 and having a thickness of 15 microns was bonded at 180° C. to one surface of a thin sheet of steel having a thickness of 0.28 mm by a thermoplastic maleic acid-modified polypropylene resin adhesive layer having a thickness of 25 microns. The other surface of the sheet had a tin layer having a plating weight of 2.8 $g/m^2$. It was intended for defining the outer surface of a can. The procedures of EXAMPLE 1 were repeated for the production of cans, their inner surface coating and their corrosion resistance tests. The results are shown in TABLE 1.

EXAMPLE 5

An aluminum foil conforming to the specification of JIS 1070 and having a thickness of 15 microns was bonded at 200° C. to one of the clean surfaces of a sheet of steel having a thickness of 0.28 mm by a thermoplastic modified polypropylene resin adhesive layer having a thickness of 10 microns. The other surface of the sheet was electroplated with 10 g of zinc per square meter. The sheet surface carrying the aluminum foil was intended for defining the inner surface of a can. The procedures of EXAMPLE 1 were repeated for the preparation of cans, their inner surface coating and their corrosion resistance tests. The results are shown in TABLE 1.

EXAMPLE 6

An aluminum foil conforming to the specification of JIS 1070 and having a thickness of 30 microns was bonded to one surface of a thin sheet of steel having a thickness of 0.26 mm by a thermoplastic polyester resin layer having a thickness of 30 microns, while the other surface of the sheet was plated with 10 g of zinc per square meter. The sheet surface carrying the aluminum foil was intended for defining the inner surface of a can. The procedure of EXAMPLE 1 were repeated for the preparation of cans, their inner surface coating and their corrosion resistance tests. The results are shown in TABLE 1.

EXAMPLE 7

A thin sheet of steel having a thickness of 0.28 mm was plated on one surface thereof with 5 g of a zinc alloy containing 2% of tin per square meter. An aluminum foil conforming to the specification of JIS 1070 and having a thickness of 30 microns was bonded to the other surface of the sheet by a thermoplastic polyethylene-vinyl acetate resin adhesive layer having a thickness of five microns. The sheet surface carrying the aluminum foil was intended for defining the inner surface of a can. The procedure of EXAMPLE 1 were repeated for the preparation of cans, their inner surface coating and their corrosion resistance tests. The results are shown in TABLE 1.

EXAMPLE 8

A sheet of steel having a thickness of 0.25 mm was coated on both surfaces thereof with 2.0 g of a zinc phosphate per square meter. An aluminum foil conforming to the specification of JIS IN30 and having a thickness of 20 microns was bonded to one surface of the sheet by a thermoplastic acrylic resin adhesive layer having a thickness of 10 microns. The other surface of the sheet was coated with 0.2 g of a synthetic lubricant oil per square meter and intended for defining the outer surface of a can. The procedures of EXAMPLE 1 were repeated for the preparation of cans, their inner surface coating and their corrosion resistance tests. The results are shown in TABLE 1.

EXAMPLE 9

A clean sheet of steel having a thickness of 0.28 mm was electroplated on one surface thereof with 3 g of zinc per square meter and a film of zinc phosphate having a coating weight of 2.5 g/m$^2$ was formed thereon. An aluminum foil provided for in the specification of JIS 3003 and having a thickness of 20 microns was bonded to the other surface of the sheet by a thermoplastic polyurethane resin adhesive layer having a dry thickness of seven microns. The sheet surface carrying the foil was intended for defining the inner surface of a can. The procedures of EXAMPLE 1 were repeated for the preparation of cans, their inner surface coating and their corrosion resistance tests. The results are shown in TABLE 1.

EXAMPLE 10

A sheet of steel having a thickness of 0.28 mm was plated on one surface thereof with 5 g of a zinc-nickel alloy containing 10% of nickel per square meter and a film of zinc phosphate having a coating weight of 2.0 g/m$^2$ was formed thereon. Then, the procedures of EXAMPLE 9 were repeated. The results are shown in TABLE 1.

EXAMPLE 11

A sheet of steel having a thickness of 0.25 mm was coated on each surface thereof with a film of metallic chromium and hydrated chromium oxide containing 120 mg of chromium per sqare meter. A thermoplastic modified vinyl resin paint was applied in a layer having a thickness of five microns to one surface of the sheet and baked at 180° C. for 10 minutes. An aluminum foil conforming to the specification of JIS IN30 and having a thickness of 50 microns was bonded to the other surface of the sheet by a hot melt type polyester resin adhesive which had been applied in a layer having a thickness of 15 microns. The sheet surface carrying the foil was intended for defining the inner surface of a can. Then, the procedures of EXAMPLE 1 were repeated for the preparation of cans, their inner surface coating, filling contents in the can and their corrosion resistance tests. The results are shown in TABLE 1.

EXAMPLE 12

A film of metallic chromium and hydrated chromium oxide containing 100 mg of chromium per square meter was formed on each surface of a thin sheet of steel having a thickness of 0.26 mm. An epoxyphenol resin paint was applied in a layer having a thickness of seven microns to one surface of the sheet and baked at 195° C. for 10 minutes. An aluminum foil conforming to the specification of JIS IN30 and having a thickness of 10 microns was bonded to the other surface of the sheet by a thermoplastic modified polypropylene resin adhesive which had been applied in a layer having a thickness of 30 microns. The sheet surface carrying the foil was intended for defining the inner surface of a can. The procedures of EXAMPLE 1 were repeated for the preparation of cans, their inner surface coating and their corrosion resistance tests. The results are shown in TABLE 1

EXAMPLE 13

A thin sheet of steel having a thickness of 0.15 mm, a hardness of $H_R30T$ 60~61, and a tensile strength of 38.3 kg/mm$^2$ was coated on both surfaces thereof with a film of 100~110 mg/m$^2$ of metallic chromium and hyrated chromium oxide containing 15~18 mg/m$^2$ of chromium. An aluminum foil having a thickness of 7 microns was bonded to the one surface of chromium film defining the inner surface of a can by a modified polypropylene adhesive layer having a thickness of 15 $\mu$m.

A thermosetting epoxyphenol resin layer having a thickness of 5 microns was coated on the aluminum foil.

A thermosetting vinyl paint was coated on the other surface of a can. Then the sheet was shaped into a can having a diameter of 77 mm and a height of 59.3 mm where an aluminum foil constitute the inner surface of a can by two steps of drawing.

Some of the cans were filled with soaked mackerel with tomato sauce and the increases of volumes of cans were measured as time passes.

The cans of the present invention show more excellent results than the cans having a thermosetting epoxyphenol resin paint of 5 $\mu$m thickness coated on the inner surface of the former tin plated cans. Test results are shown in TABLE 2.

EXAMPLE 14

A thin sheet of steel having a thickness of 0.05 mm, a hardness of $H_{RT}58$, and a tensile strength of 34 kg/mm$^2$ was coated on both surfaces thereof with a film of 40~50 mg/m$^2$ of metallic chromium and hydrated chromium oxide containing 15~18 mg/m$^2$ of chromium. An aluminum foil having a thickness of 7 μm was bonded to the one surface of chromium film by a modified polypropylene adhesive. A thermosetting vinyl paint of each 5 microns was coated on both surfaces of the can and baked at 160° C. for 10 minutes. Then the sheet was shaped into a can having a average diameter of 62 mm (bottom diameter of 60 mm, upper diameter of 64 mm) where an aluminum foil make the internal surface of a can by drawing.

Some of cans were filled with soft bean jelly, and left in that condition at 38° C. for one year. They were opened after one year, and the dissolution of iron, taste and the condition of the inner surface of cans were tested. No problems were recognized.

COMPARATIVE EXAMPLE 1

A sheet of steel having a thickness of 0.25 mm was plated on each surface thereof with 2.8 g of tin per square meter. Then, the procedures of EXAMPLE 1 were repeated for the preparation of cans, filling contents in the can, and their corrosion resistance tests. The results are shown in TABLE 1.

COMPARATIVE EXAMPLE 2

The procedures of EXAMPLE 1 were repeated for preparing cans from a thin sheet of steel having a thickness of 0.28 mm and plated on each surface thereof with 2.8 g of tin per square meter. A paint was sprayed in a quantity of 80 to 100 mg/m$^2$ onto the inner surface of each can. This inner surface coating was repeated twice. Then, the cans (which are equivalent to commonly used cans) were tested in accordance with the procedures of EXAMPLE 1.

COMPARATIVE EXAMPLE 3

A thin sheet of steel having a thickness of 0.27 mm was plated on one surface thereof with 2.8 g of tin per square meter. An unoriented polypropylene film having a thickness of 50 microns was bonded to the other surface of the sheet by a polyurethane resin adhesive which had been applied in a layer having a thickness of five microns. The sheet surface carrying the polypropylene film was intended for defining the inner surface of a can. The procedures of EXAMPLE 1 were repeated for making drawn and ironed cans. The drawn and ironed cups could not be separated from the punch. The cans were caught by the release pawls on the punch and broken at the upper ends thereof. No can that could be tested was produced.

As is obvious from TABLE 1, all of the cans prepared in accordance with this invention showed a lower degree of iron elution than any of the cans according to the comparative examples and exhibited excellent corrosion resistance without having any hole formed by corrosion even after six months of a corrosion test.

The steel sheet of this invention having an aluminum or aluminum alloy layer on one surface thereof defining the inner surface of a can enables the economical production of a can having excellent corrosion resistance, as it has a high degree of workability and does not require any repeated coating on the inner surface of the can.

TABLE 1

| | Composition of Layers: Layers before making cans: Inner Surface | Composition of Layers: Layers before making cans: Outer Surface | Composition of Layers: Layers On Can Surface: Inner Surface | Rust Resistance Hrs, until 1% Red Rust Formed: 40° C.) | Corrosion Resistance (38° C. 6 months): Perforation (cans): Cola | Corrosion Resistance (38° C. 6 months): Perforation (cans): Sprite | Corrosion Resistance (38° C. 6 months): Dissolution of Iron (ppm): Cola | Corrosion Resistance (38° C. 6 months): Dissolution of Iron (ppm): Sprite |
|---|---|---|---|---|---|---|---|---|
| Examples | | | | | | | | |
| 1 | Polyester Resin (5 μm) + Al (20 μm) | Epoxy Resin (5 μm) + Al (20 μm) | Polyester Resin (1.6 μm) + Al (6.6 μm) + Epoxyphenol Resin (5 μm) | 1000 | 0 | 0 | 0.04～ 0.06 | 0.05～ 0.08 |
| 2 | Cr Layers (120 mg/m²) + Nylon Resin (20 μm) + Al (15 μm) | Sn (2.7 g/m²) | Nylon Resin (6.7 μm) + Al (5.0 μm) + Epoxyphenol Resin (5 μm) | 2 | 0 | 0 | 0.01～ 0.04 | 0.02～ 0.06 |
| 3 | Polyurethane Resin (7 μm) + Al (30 μm) | Sn (2.8 g/m²) | Polyurethane Resin (2.3 μm) + Al (9.9 μm) + Epoxyphenol Resin (5 μm) | 4 | 0 | 0 | 0.03～ 0.06 | 0.03～ 0.07 |
| 4 | Maleic acid modified Polypropylene Resin (25 μm) + Al (15 μm) | Sn (2.8 g/m²) | Maleic acid Modified Polypropylene (8.2 μm) + Al (4.9 μm) + Epolyphenol Resin (5 μm) | 2 | 0 | 0 | 0.01～ 0.04 | 0.01～ 0.05 |
| 5 | Modified Polypropylene (10 μm) + Al (15 μm) | Zn (10 g/m²) | Modified Polypropylene Resin (3.4 μm ) + Al (5.2 μm) + Epoxyphenol Resin (5 μm) | 350 | 0 | 0 | 0.03～ 0.05 | 0.02～ 0.06 |
| 6 | Polyester Resin (30 μm) + Al (30 μm) | Zn (10 g/m²) | Polyester Resin (9.8 μm) + Al (9.8 μm) + Epoxyphenol Resin (5 μm) | 350 | 0 | 0 | 0.01～ 0.03 | 0.01～ 0.03 |
| 7 | Polyethylene-Vinyl Acetate resin (5 μm) + Al (30 μm) | Zn—Sn (2%) Alloy (5 g/m²) | Polyethylene-Vinyl Acetate Resin (1.7 μm) + Al (10 μm) + Epoxyphenol Resin (5 μm) | 70 | 0 | 0 | 0.03～ 0.07 | 0.03～ 0.06 |
| 8 | Zinc Phosphate (2.0 g/m²) + Acrylic Resin (10 μm) + Al (20 μm) | Zinc Phosphate (2.0 g/m²) + Synthetic Lubricant Oil (0.2 g/m²) | Acrylic Resin (3.8 μm) + Al (7.5 μm) + Epoxyphenol Resin (5 μm) | 1 | 0 | 0 | 0.03～ 0.06 | 0.04～ 0.06 |
| 9 | Polyurethane Resin (7 μm) + Al (20 μm) | Zn (3 g/m²) + Zinc Phosphate (2.5 g/m²) | Polyurethane Resin (2.4 μm) + Al (6.8 μm) + Epoxyphenol Resin (5 μm) | 80 | 0 | 0 | 0.03～ 0.06 | 0.04～ 0.06 |
| 10 | Polyurethane Resin (7 μm) + Al (20 μm) | Zn—Ni (10%) Alloy (5 g/m²) + Zinc Phosphate (2.0 g/m²) | Polyurethane Resin (2.4 μm) + Al (6.8 μm) + Epoxyphenol Resin (5 μm) | 400 | 0 | 0 | 0.03～ 0.07 | 0.04～ 0.07 |
| 11 | Cr Layers (120 mg/m²) + Polyester Resin (15 μm) + Al (50 μm) | Cr Layers (120 mg/m²) + Modified Vinyl Resin (5 μm) | Polyester Resin (4.9 μm) + Al (16.4 μm) + Epoxyphenol Resin (5 μm) | 100 | 0 | 0 | 0.02～ 0.04 | 0.03～ 0.06 |
| 12 | Cr Layers (100 mg/m²) + Modified Polypropylane (30 μm) + Al (10 μm) | Cr Layers (100 mg/m²) + Epoxyphenol Resin (7 μm) | Modified Polypropylene (10.3 μm) + Al (3.4 μm) + Epoxyphenol Resin (5 μm) | 100 | 0 | 0 | 0.01～ 0.04 | 0.01～ 0.03 |
| Comparative Examples | | | | | | | | |
| 1 | Sn (2.8 g/m²) | Sn (2.8 g/m²) | Sn (0.9 g/m²) + Epoxyphenol Resin (5 μm) | 4 | 12/40 | 14/50 | 0.04～ 0.12 | 0.05～ 0.18 |
| 2 | Sn (2.8 g/m²) | Sn (2.8 g/m²) | Sn (0.9 g/m²) + Epoxyphenol Resin (10 μm) | 2 | 1/50 | 1/50 | 0.061～ 0.09 | 0.07～ 0.09 |
| 3 | Polyurethane Resin (5 μm) + Unoriented Polypropylene Resin (50 μm) | Sn (2.8 g/m²) | — | — | — | — | — | — |

TABLE 2

| | | Test Period | | | |
|---|---|---|---|---|---|
| Samples | Test Temp. | 3 months | 6 months | 12 months | 24 months |
| Cans of the Invention | Normal Temp. | <0.01 mm | <0.01 mm | <0.01 mm | <0.1 mm |
| | 38° C. | <0.01 mm | 0.01 mm | 0.05 mm | 0.12 mm |
| Former Cans | Normal Temp. | <0.01 mm | <0.01 mm | <0.01 mm | 0.02 mm |
| | 38° C. | <0.01 mm | 0.02 mm | 0.06 mm | 0.15 mm |

What is claimed is:

1. A drawn and ironed can comprising a wall formed from a thin sheet of steel and having an inner surface carrying a layer of a thermoplastic resin thereon, a foil on said thermoplastic resin layer, and a layer of a thermosetting resin on said foil, said foil being of a material selected from aluminum and an aluminum alloy; wherein the thermoplastic resin layer covers the entire inner surface of the steel sheet, the foil covers the entire thermoplastic resin layer and the thermosetting resin layer covers the entire foil.

2. A drawn and ironed can as claimed in claim 1, wherein said thermoplastic resin layer has a thickness of 1 to 30 microns, said foil has a thickness of 1 to 30 microns and said thermosetting resin layer has a thickness of 1 to 15 microns.

3. A drawn can comprising a wall formed from a thin sheet of steel and having an inner surface carrying a layer of a thermoplastic resin thereon, a foil on said thermoplastic resin layer, and a layer of a thermosetting resin on said foil, said foil being of a material selected from aluminum and an aluminum alloy; wherein the thermoplastic resin layer covers the entire inner surface of the steel sheet, the foil covers the entire thermoplastic resin layer and the thermosetting resin layer covers the entire foil.

4. A drawn can as claimed in claim 3, wherein said thermoplastic resin layer has a thickness of 1 to 30 microns, said foil has a thickness of 1 to 30 microns and said thermosetting resin layer has a thickness of 1 to 15 microns.

5. A drawn and ironed can comprising:

a wall formed from a thin sheet of steel;

a thermoplastic resin layer provided on an inner surface of said wall, said thermoplastic resin layer completely covering said inner surface and having a thickness of 1 to 30 microns;

a foil on said thermoplastic resin layer such that said foil completely covers said thermoplastic resin layer, said foil comprising a material selected from the group consisting of aluminum and aluminum alloys and having a thickness of 1 to 30 microns;

a thermosetting resin layer on said foil such that said thermosetting resin layer completely covers said foil, said thermosetting resin layer having a thickness of 1 to 15 microns; and a lubricant film providing on an outer surface of said wall, said lubricant film being selected from the group consisting of a tin or tin alloy film, a zinc or zinc alloy film, a phosphate film, a molybdenum disulfide film, a phosphate film on a zinc film, a phosphate film on a zinc alloy film, a film of an organic substance, and a film of an organic substance on a film of at least one of metallic chromium and hydrated chromium oxide.

6. A drawn can comprising:

a wall formed from a thin sheet of steel;

a thermoplastic resin layer provided on an inner surface of said wall, said thermoplastic resin layer completely covering said inner surface and having a thickness of 1 to 30 microns;

a foil on said thermoplastic resin layer such that said foil completely covers said thermoplastic resin layer, said foil comprising a material selected from the group consisting of aluminum and aluminum alloys and having a thickness of 1 to 30 microns;

a thermosetting resin layer on said foil such that said thermosetting resin layer completely covers said foil, said thermosetting resin layer having a thickness of 1 to 15 microns; and a lubricant film provided on an outer surface of said wall, said lubricant film being selected from the group consisting of a tin or tin alloy film, a zinc or zinc alloy film, a phosphate film, a molybdenum disulfide film, a phosphate film on a zinc film, a phosphate film on a zinc alloy film, a film of an organic substance, and a film of an organic substance on a film of at least one of metallic chromium and hydrated chromium oxide.

7. A method of making a drawn and ironed can which comprises:

providing a thin sheet of steel carrying a layer of a thermoplastic resin on at least one surface thereof and a foil on said resin layer, said foil being of a material selected from aluminum and an aluminum alloy;

drawing and ironing said sheet into a can having an inner surface defined by said foil; and coating said inner surface with a thermosetting resin.

8. A method of making a drawn can which comprises:

providing a thin sheet of steel carrying a layer of a thermoplastic resin on at least one surface thereof and a foil on said resin layer, said foil being of a material selected from aluminum and an aluminum alloy;

coating said foil with a thermosetting resin; and drawing said sheet into a can having an inner surface defined by said coated foil.

* * * * *